United States Patent [19]

Wen

[11] Patent Number: 5,524,733
[45] Date of Patent: Jun. 11, 1996

[54] ADJUSTING DEVICE OF BRAKE RODS FOR BICYCLES

[76] Inventor: Chun T. Wen, 421, Wen Sin South 5th Road, Taichung, Taiwan

[21] Appl. No.: 278,512

[22] Filed: Jul. 22, 1994

[51] Int. Cl.⁶ ............................................. B62L 1/14
[52] U.S. Cl. ............................ 188/24.21; 188/196 M; 188/24.19; 74/501.5 R; 74/502.6; 74/586
[58] Field of Search ................ 74/501.5 R, 502.6, 74/586; 188/24.19, 24.21, 24.11, 71.17, 196

[56] References Cited

U.S. PATENT DOCUMENTS

| | | | |
|---|---|---|---|
| 2,160,181 | 5/1939 | Taylor | 188/24.21 |
| 4,026,390 | 5/1977 | Yoshigai | 188/24.21 |
| 4,256,205 | 3/1981 | Hamar | 188/24.21 |
| 5,060,534 | 10/1991 | Yoshigai | 188/24.21 |
| 5,125,167 | 6/1993 | Davidson | 188/24.21 |

Primary Examiner—David M. Mitchell
Assistant Examiner—Clifford T. Bartz

[57] ABSTRACT

An adjusting device of brake rods for bicycles includes a connector, two rods and two receivers. The two rods each has first and second ends, the first end thereof rotatably engaged to the connector and the second end thereof having a threaded portion for engaged to the receiver which is pivotally engaged to a brake arm. A user adjusts the rod by rotating the rod corresponding to the receiver.

3 Claims, 4 Drawing Sheets

ADJUSTING DEVICE OF BRAKE RODS FOR BICYCLES

BACKGROUND OF THE INVENTION

The present invention relates to an adjusting device, and more particularly, to an adjusting device of brake rods for bicycles.

Generally, a conventional brake device of a bicycle, shown in FIG. 1, includes a first cable 14, a connector 13, a second cable 12 and two brake arms 10 each with a brake rubber 12 disposed thereon. The first cable 54 has one end connected to a brake lever (figure not shown), and the other end connected to the connector 13 by a bolt 131. The connector 13 has a groove defined by two lugs 132 extending upward for receiving the second cable 12 therein. The second cable 12 has two ends, each end is fixedly engaged to an end of the respective brake arm 10 by a bolt 11 in which a hole (figure not shown) is defined for the second cable 12 inserting therethrough, the other end of the brake arm 10 is pivotally engaged to a front fork 15 of the bicycle. The brake rubber 12 is disposed between the two ends of the brake arm 10 and extends toward to a wheel 16 of the bicycle. When a user want stop the bicycle, the first cable 14 is pulled upward by pulling the brake lever mentioned above, the connector 13 and the second cable 12 are therefore pulled upward too. The two brake arms 10 are rotated about the respective pivotal ends thereof by the upward action of the second cables 52 and the brake rubbers 12 are then clipped the wheel 16 to stop the bicycle.

However, the second cable 12 tends to loose after using a period of time, and an adjustment of the second cable 12 is not an easy job for a regular user. The user has to screw the bolt 11 with one hand and pull the second cable 12 with the other hand, that is not an easy job. Furthermore, the user has to check a balance between the two brake arms 10 during the adjustment therebetween because the two brake arms 10 are connected by a single second cable 12.

The present invention intends to provide an adjusting device which needs only a rotation action and can achieve the purpose of adjusting the brake device and mitigate and/or obviate the above-mentioned problems.

SUMMARY OF THE INVENTION

The present invention provides an adjusting device of brake rods for bicycles includes a connector, two rods and two receiver. The two rods each has a first end rotatably engaged to the connector and a second end having a threaded portion defined therein and engaged to the receiver which is pivotally engaged to a brake arm, such that a user can adjust the rods simply by rotating the rods.

It is an object of the present invention to provide an adjusting device which has two rods connected between the connector and the brake arm, and a length of the rod between the first end of the receiver and the connector is adjusted by rotating the rod.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
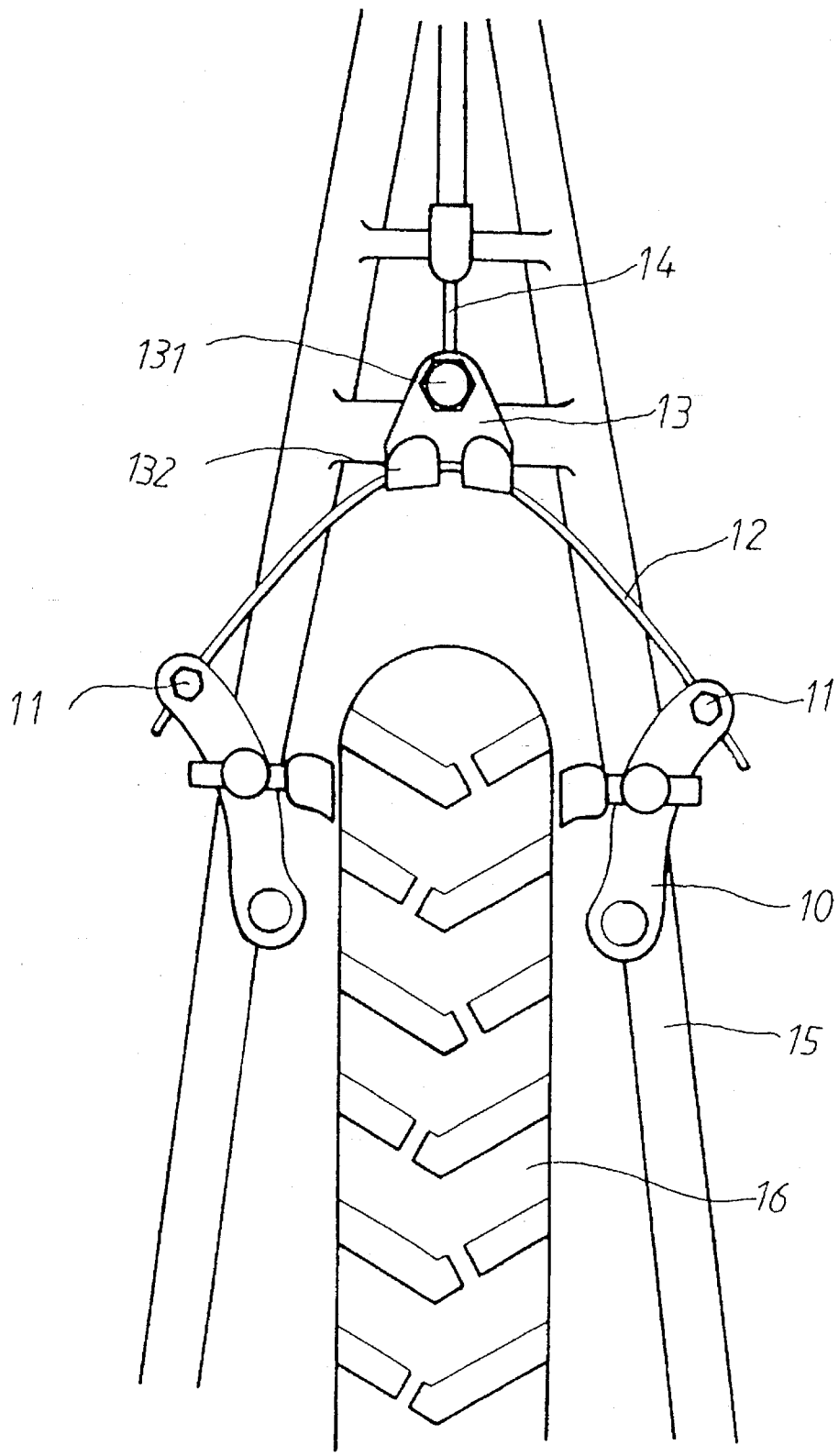
FIG. 1 is a perspective view of a conventional brake device for a bicycle.
Figure 2:
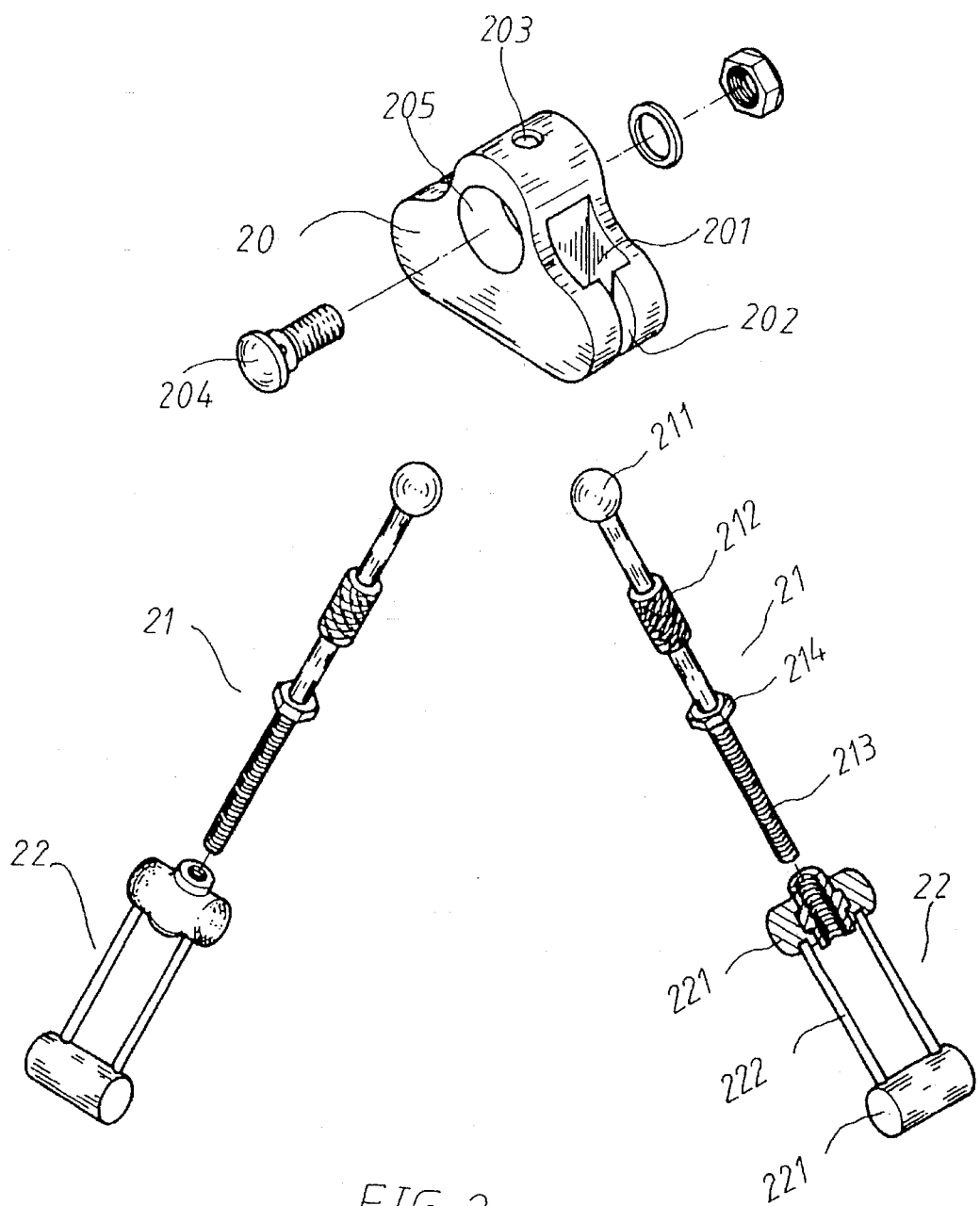
FIG. 2 is an exploded view of an adjusting device in accordance with the present invention.
Figure 3:
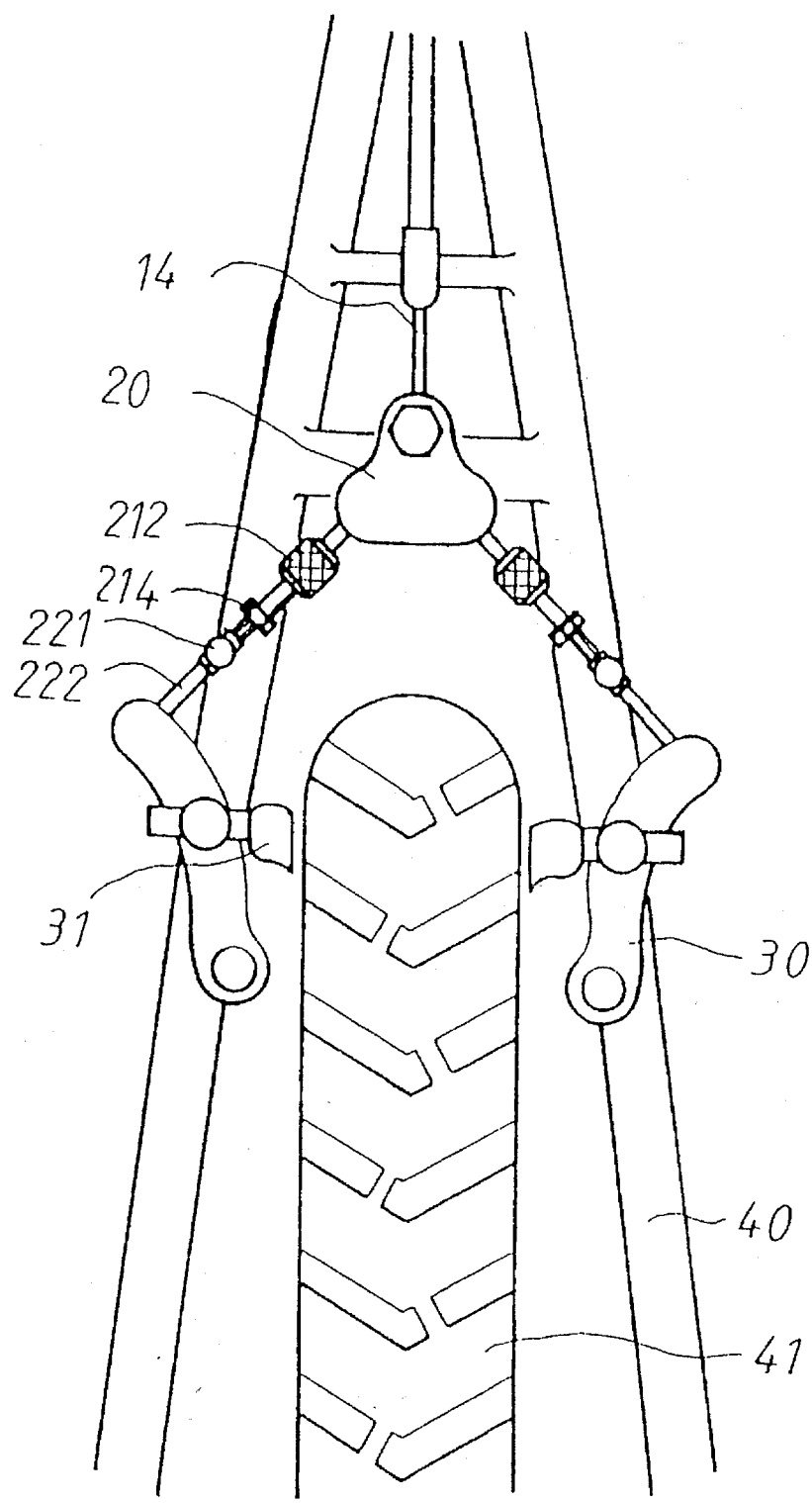
FIG. 3 is a front side elevational view of the adjusting device in accordance with the present invention.

Referring to the drawings and initially to FIGS. 2 and 3, an adjusting device in accordance with the present invention generally includes a connector 20, two rods 21, two receivers 22 and two brake arms 30. The connector 20 has two recesses 201 and two through ways 201 defined therein and each through way 201 communicates with its respective recess 201. An top hole 203 is defined in the connector 20 for an end of a main brake cable 14 inserted therein and which is fixedly engaged by a bolt 204 engaged transversely in a hole 205 defined in the connector, the other end of the main brake cable 14 is connected to a brake lever (figure not shown).

The rod 21 has a first end having a head 211 which is received in the recess 201 of the connector via the through way 202 such that the rod 21 is rotatably engaged to the connector 20, and a second end having a threaded portion 213. An operation part 212 is fixedly disposed to the rod 21 and extends laterally therefrom in which a rough surface is defined, and a nut 214 is engaged to the threaded portion 213 of the rod 21. The receiver 22 has first and second ends each forms as a cylindrical element, the first end has a threaded hole 222 defined therein for engagement to the threaded portion 213 of the rod 21. The first and second ends of the receiver 22 are connected by two cables 222. The brake arm 30 has first end pivotally engaged to a front fork 40 of the bicycle and a second end having a hole (figure not shown) defined therein for pivotally engagement to the second end of the receiver 22, and a brake rubber 31 is disposed to the brake arm 30 between the first and second ends of the brake arm 30.

Figure 4:
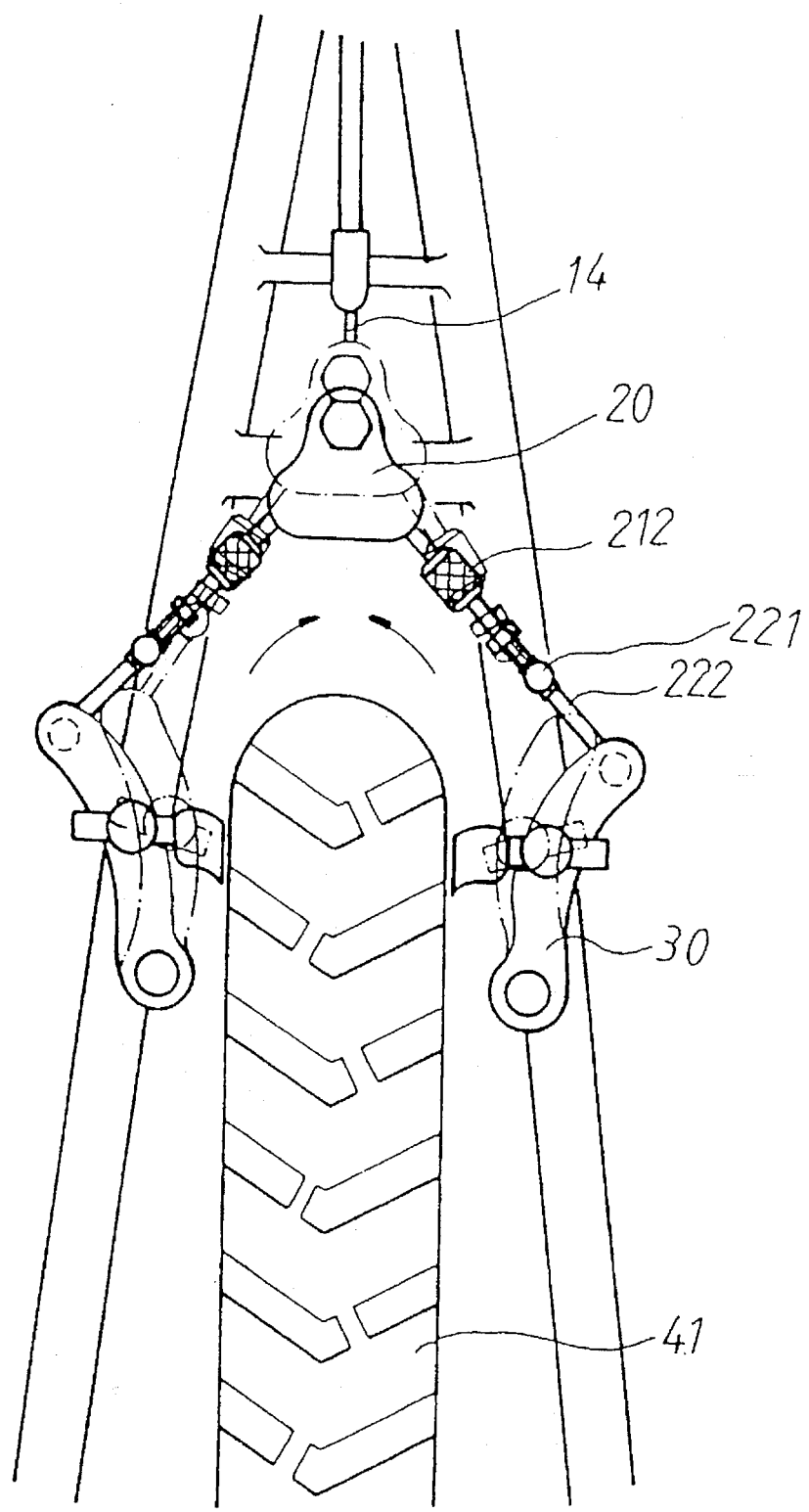
FIG. 4 is a front side elevational view of the adjusting device and the movements of elements thereof are shown in phantom lines.

Referring now to FIG. 4, when a user wants to stop the bicycle, he or she pulls a brake lever (figure not shown) to pull the main brake cable 14 and the connector 20 up so as to pull the brake arm 30 to let the brake arm 30 rotate about the first end thereof to stop a wheel 41 by the brake rubber 31. When adjusting the rod 21, the user needs only to use two fingers to rotate the operation part 212 fixedly disposed to the rod 21 such that a length of the rod 21 between the connector 20 and the first end of the receiver 22 can be adjusted. A position of the threaded portion 213 inserted through the first end of the receiver 20 is maintained by the nut 214.

Accordingly, to adjust the rod 21 in accordance with the present invention becomes an easy job, any one can adjust the rods 21 whenever he or she wants and no tools are required.

Although the invention has been explained in relation to its preferred embodiment, it is to be understood that many other possible modifications and variations can be made without departing from the spirit and scope of the invention as hereinafter claimed.

I claim:

1. An adjusting device of brake rods for bicycles, comprising:

a connector, said connector having two recesses defined therein;

two rods, each having first and second ends, said first end thereof rotatably engaged to one of said recess of said connector, said second end thereof having a threaded portion defined therein and each rod having a directly contacting operation part disposed thereto, said operation part having a rough surface defined therein;

a receiver for each rod having first and second ends, each said first end thereof having a threaded hole defined therein for engagement with said threaded portion of one of said rods, each said second end thereof pivotally engaged to a corresponding brake arm.

2. The adjusting device as claimed in claim 1 wherein said rod has a nut engaging to said threaded portion thereof.

3. The adjusting device as claimed in claim 1 wherein said first end and said second end of said receiver are connected by at least one cable.

* * * * *